UNITED STATES PATENT OFFICE.

FRANCIS E. GALLAGHER, OF NEWTON, AND HARRY S. MORK, OF BOSTON, MASSACHUSETTS, ASSIGNORS TO STANDARD ALCOHOL COMPANY, OF NEW YORK, N. Y., A CORPORATION OF MAINE.

PROCESS OF PRODUCING SUGARS FROM CELLULOSE.

1,056,162. Specification of Letters Patent. Patented Mar. 18, 1913.

No Drawing. Application filed July 15, 1912. Serial No. 709,569.

*To all whom it may concern:*

Be it known that we, (1) FRANCIS E. GALLAGHER and (2) HARRY S. MORK, citizens of the United States, residing at (1) Newton and (2) Boston, in the counties of (1) Middlesex and (2) Suffolk and State of (1 and 2) Massachusetts, have invented certain new and useful Improvements in Processes of Producing Sugars from Cellulose, of which the following is a specification.

This invention relates to processes of producing sugars from sawdust, wood-waste, or other forms of ligno-cellulose, or from other cellulosic raw materials.

It is well known that the so-called waste sulfite liquors resulting from the manufacture of sulfite pulp contain a certain proportion of fermentable sugars, and it has been proposed heretofore to neutralize such liquors and to subject the same to processes of fermentation and distillation for the production of alcohol. We have found that such waste liquors are capable, under proper conditions of digestion, of exerting a strong hydrolytic action upon ligno-cellulose and cellulosic materials in general; and that their hydrolytic action may be further increased by adding to the liquors small proportions of strong mineral acids, as sulfuric acid.

Example I: The waste sulfite liquor used contained 7.5 per cent. of soluble substances, of which 1.4 per cent. were of a reducing character. This liquor was added to sawdust in proportion to give a three to one liquor ratio in the mass, and the mixture was digested for thirty minutes under 135 pounds steam pressure. The digested product yielded results as follows, all figures being based on the dry weight of the original sawdust:

| | | |
|---|---|---|
| Total solids | 31.2 | per cent. |
| Reducing sugars | 22.4 | " " |
| Fermentable sugars | 7.65 | " " |
| Ratio of fermentable sugars to total solids | 24.5 | |
| Ratio of fermentable sugars to reducing sugars | 34.2 | |
| Alcohol (on fermentation) | 3.8 | per cent. |

Of the 22.4 per cent. of reducing substances present at the conclusion of the cook, 4.2 per cent. were added with the waste sulfite liquor. Approximately 18 per cent. of reducing substances were therefore formed by the hydrolyzing action of the waste sulfite liquor upon the wood or upon its own non-reducing soluble constituents.

Example II: 0.33 per cent. of sulfuric acid was added to a waste sulfite liquor having the characteristics and approximate composition described in Example I, and sawdust was digested with the acidified liquor, using a three to one liquor ratio and digesting at 135 pounds steam pressure for a period of thirty minutes. The sulfuric acid added was equivalent to one per cent. of the dry sawdust. Calculation from the analyses of the waste sulfite liquor used showed that there was introduced into the mass with the liquor 9 per cent. of soluble solids and 3.2 per cent. of reducing matters. At the end of the cook, the results were as follows, the composition of the extract being calculated to the dry material of the sawdust:

| | | |
|---|---|---|
| Total solids | 38.7 | per cent. |
| Reducing sugars | 25.1 | " " |
| Fermentable sugars | 7. | " " |
| Ratio of fermentable sugars to total solids | 19. | |
| Ratio of fermentable sugars to reducing sugars | 28. | |
| Alcohol (on fermentation) | 3.5 | per cent. |

Since of the 25.1 per cent. of reducing substances found at the end the cook, 3.2 per cent. were added with the waste sulfite liquor, it follows that approximately 22 per cent. of reducing substances were produced as a result of the cook. Of this amount nearly all was derived from the sawdust, since cooking the waste sulfite liquor alone with sulfuric acid did not appreciably increase the percentage of reducing substances therein.

Instead of waste sulfite liquors, it is practicable to employ fresh sulfite liquors similar to those commonly used for the preparation of sulfite pulp, employing them however under entirely different conditions of concentration, time and other conditions of digestion, etc. In other words, instead of adapting the conditions to the production of pulp, they are adapted to the maximum production of reducing sugars.

Example III: A liquor prepared by absorbing sulfur dioxid in milk of lime, and containing one per cent. of total $SO_2$, was added to sawdust in the proportion of three parts of liquor to one part of the dry material in the sawdust, and the mixture was digested for 30 minutes under 135 pounds pressure of steam. The cooked mass was found to contain 29.3 per cent. of soluble solids and 24.2 per cent. of reducing substances.

We claim:

1. In a process of producing sugars from cellulosic raw material, the step which consists in subjecting such material to the hydrolyzing action of sulfite liquor.

2. In a process of producing sugars from cellulosic raw material, the step which consists in subjecting such material to the hydrolyzing action of sulfite liquor containing fermentable sugars resulting from a previous digestion of wood.

In testimony whereof, we affix our signatures in presence of two witnesses.

FRANCIS E. GALLAGHER.
HARRY S. MORK.

Witnesses:
ARTHUR D. LITTLE,
AMY MONTGOMERY.